(12) United States Patent
Mrofka et al.

(10) Patent No.: US 6,913,277 B2
(45) Date of Patent: Jul. 5, 2005

(54) TOWING HITCH EXTENSION

(76) Inventors: Robert J. Mrofka, 1450 N. Astor #15A, Chicago, IL (US) 60610; Ted Kowalski, 8656 N. Ozanam, Niles, IL (US) 60714

( * ) Notice: Subject to any disclaimer, the term of this patent is extended or adjusted under 35 U.S.C. 154(b) by 0 days.

(21) Appl. No.: 10/615,315

(22) Filed: Jul. 8, 2003

(65) Prior Publication Data

US 2005/0006874 A1 Jan. 13, 2005

(51) Int. Cl.[7] .................................................. B60D 1/52
(52) U.S. Cl. ..................................... 280/491.5; 293/117
(58) Field of Search .......................... 280/416.1, 416.3, 280/491.5, 476.1; 293/117

(56) References Cited

U.S. PATENT DOCUMENTS

| | | | |
|---|---|---|---|
| 3,853,255 A | 12/1974 | Spencer | |
| 4,202,562 A | 5/1980 | Sorenson | |
| 5,497,927 A * | 3/1996 | Peterson | ..................... 224/519 |
| D374,645 S | 10/1996 | Hanson et al. | |
| 5,570,826 A | 11/1996 | Garbes et al. | |
| 5,884,930 A * | 3/1999 | Cluth | ......................... 280/497 |
| 6,039,227 A | 3/2000 | Stark | |
| 6,099,035 A | 8/2000 | Garvin, III | |
| 6,511,088 B2 | 1/2003 | Kahlstorf | |
| 6,742,799 B1 * | 6/2004 | Hansen | ....................... 280/495 |
| 2004/0156205 A1 * | 8/2004 | Pisciotti | ...................... 362/485 |

* cited by examiner

*Primary Examiner*—Kevin Hurley
(74) *Attorney, Agent, or Firm*—Olson & Hierl, Ltd.

(57) ABSTRACT

A towing hitch extension is provided that is adapted to protect the rear bumper, especially a plastic bumper, of a towing vehicle. The hitch extension includes a tow bar with front ends and rear ends. The front end couples to the rear towing hitch of the towing vehicle. The rear end is mounted to a transversely extending, horizontally oriented, enlongated cross bar medially an also to a trailer hitch receiver hitch receiver that is somewhat above the tow bar. A pair of guard projections, such a pair of tow hooks for example, upstand from the cross bar on either side of the tow bar. Braces, preferably metal plate members, are preferably mounted to the tow bar and the cross bar to strengthen the position of the cross-bar relative to the tow bar.

20 Claims, 4 Drawing Sheets

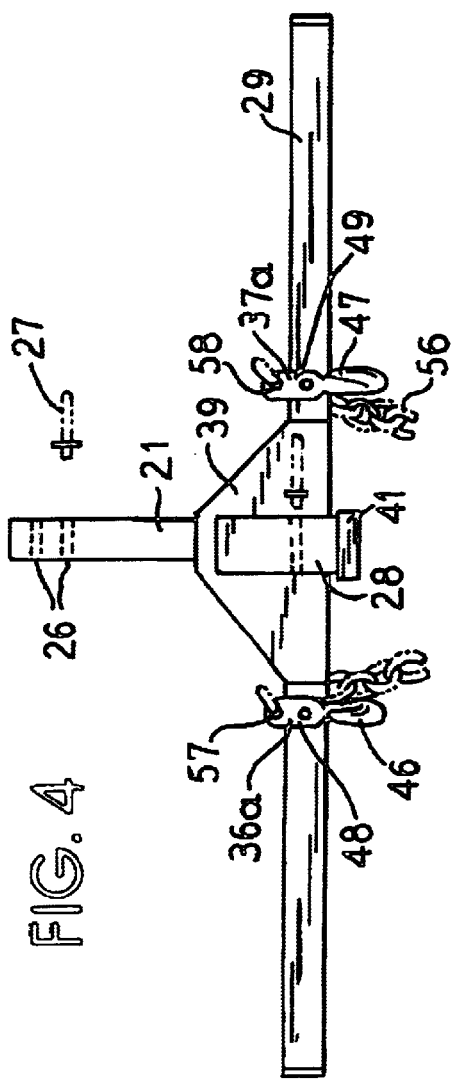
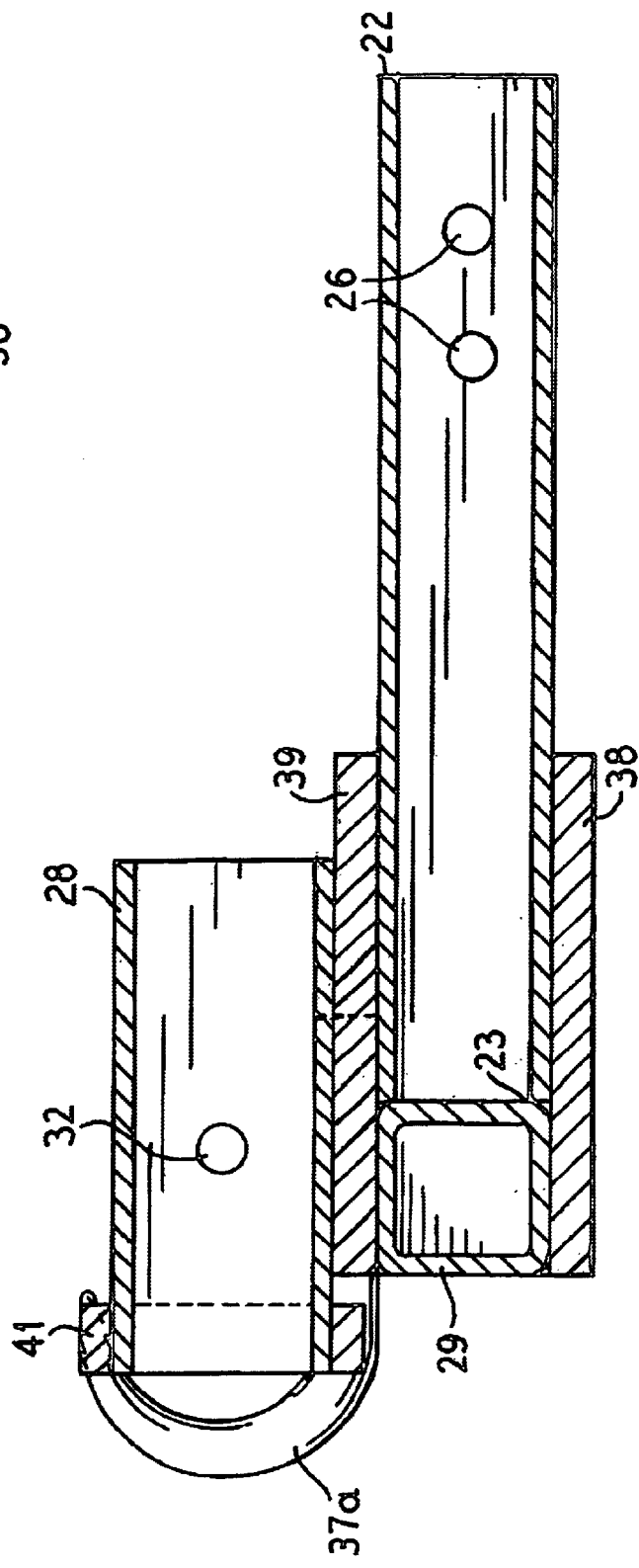

TOWING HITCH EXTENSION

FIELD OF THE INVENTION

This invention relates to trailer hitch extensions, and more particularly relates to a towing hitch extension that protects the rear bumper of the towing vehicle.

BACKGROUND OF THE INVENTION

When a towing vehicle is backed up and maneuvered to engage a trailer, or towed vehicle, misjudgments can occur. For example, if the towing vehicle is backed up too far, the trailer coupler can bump against and damage the rear bumper of the towing vehicle. This is a particular problem when the towing vehicle is provided with a plastic bumper, which is usually the case with recently manufactured vehicles, because even a slight impact by the trailer coupler can be sufficient to scratch or dent the plastic bumper. Repairing or replacing the plastic bumper can be an expensive proposition.

While various types of trailer hitch assemblies are available commercially, none is known which protects the rear plastic bumper of a towing vehicle against accidental impacts by a trailer coupler such as can occur particularly during the process of connecting the trailer to the towing vehicle. For example, various towing hitch extensions are disclosed in the prior art, but these appear to serve various special purposes rather than to protect the rear bumper of a towing vehicle.

It is thus believed that there is a substantial need in the art for a towing hitch extension that is adapted to protect the rear bumper of a towing vehicle.

The present invention meets this need and provides a new, improved and easily utilized towing hitch extension.

SUMMARY OF THE INVENTION

This invention relates to a towing hitch extension that is adapted to protect the rear bumper, especially a plastic bumper, of a towing vehicle.

The towing hitch extension of this invention includes a tow bar having front and rear ends. The front end couples to the rear towing hitch of the towing vehicle. Preferably, the front end is telescopically received in a hitch socket of the towing hitch and the interconnected members are connected together by a hitch pin.

The rear end is mounted against the mid-region of a transversely extending, horizontally oriented, elongated cross bar. Also, a rearwardly opening towing hitch socket is positioned and mounted over and above, but adjacent to, the rear end.

Preferably, the tow bar, the cross bar and the hitch sockets are tubular, cross sectionally rectangular, and comprised of steel.

Each hitch socket is preferably adapted for use as a receiver structure for telescopically and matingly engaging a hitch ball mount structure. After a ball mount is so engaged with a hitch socket, the engaged structures are conventionally retained together by a hitch pin that preferably is transversely received in and extends through aligned apertures in the engaged members sidewalls. After being so received, the hitch ball structure is adapted to pull a towed trailer or the like.

Braces preferably mount to the tow bar and to the cross bar so as to rigidify and strengthen the position of the cross bar relative to the tow bar. Preferably, the braces comprise a pair of metal plate members that are preferably mounted in vertically spaced, adjacent relationship with one plate being above the other in the region where the tow bar abuts against the cross bar mid region so that respective opposed upper and lower surface portions of these bars are between the plate members with one plate member being over, and the other below, the tow bar and the adjoining cross bar. Preferably, the braces are welded to the tow bar and the cross bar. Preferably, the brace members of a pair are each hexagonally sided.

Preferably, the upper surface of the upper plate member is welded to a bottom portion of the rearwardly opening towing hitch socket.

Preferably, a pair of guard projections, such as a pair of tow hooks for one preferred example, upstand from the cross bar on either side of the tow bar. Preferably, each guard projection is positioned in laterally, preferably equally, spaced but adjacent relationship relative to a different respective opposite side of the tow bar. Preferably, the guard projections are mounted to the cross bar by weldments.

A present preference is to employ a tow hook for each of the guard projections. When the guard projections are tow hooks, preferably each tow hook is oriented so that the hook portion thereof is forwardly opening and the base portion thereof extends transversely across and against an upper surface of the cross bar.

Preferably, the base portion of each tow hook includes a region that extends forwardly beyond the cross bar and each such region includes an aperture therethrough that is adapted to receive and engage a terminal end portion, such as an S-hook or the like, of a safety chain whose mid-region (or sometimes an opposite end region) is adapted to engage with a portion of a towed vehicle having a hitch with a tongue that is engaged with a ball mount that is connected to the trailer hitch socket.

The inventive towing hitch extension provides a combination of components that achieves a protective and practical safety device that is particularly useful and effective for protecting the rear bumper and even adjacent locations of a hitch-equipped towing vehicle. The cross bar receives impacting portions of a misaligned connecting hitch of a towed vehicle. The upstanding guard projections when present provide a safety zone between themselves and function to protect the hitch socket therebetween from inadvertent impacts. The bracing arrangement, particularly the preferred bracing arrangement, when used provides a very sturdy and impact resistant structure that resists penetration by a misaligned connecting hitch of a towed vehicle or the like. The towing hitch extension avoids or minimizes damaging effects caused by misalignment and misjudgments of the sort that can occur during the procedure of connecting a towing vehicle with a towed vehicle.

The present invention overcomes the disadvantages of prior art towing hitch extensions and solves the problem of protecting rear bumpers of towing vehicles from inadvertent, accidental impacts by a trailer coupler or the like.

The present invention provides a practical, reliable, simple, sturdy, durable towing hitch extension that can be reliably utilized with conventional towing equipment in a simple, easy and safe manner.

Other and further objects, aims, features, purposes, variations, alternatives, and the like will be apparent to those skilled in the art from the teachings of the present specification taken with the appended drawings and the accompanying claims.

BRIEF DESCRIPTION OF THE DRAWINGS

In the Figures:

FIG. 4 is a top plan view of the hitch extension of FIG. 1;

FIG. 6 is a medial, vertical, longitudinal sectional view taken through the hitch extension of FIG. 1 along the line VI—VI of FIG. 5.

DETAILED DESCRIPTION

Figure 1:
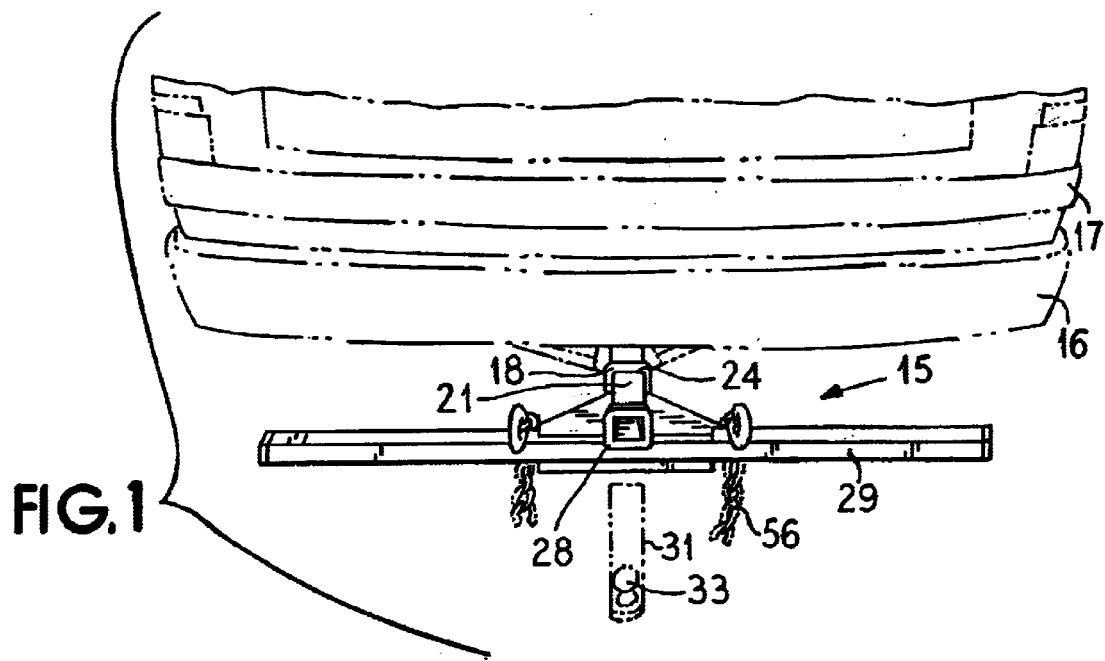
FIG. 1 is an environmental perspective view of one presently preferred embodiment of a towing hitch extension of the present invention shown in association with the rear towing hitch of a towing vehicle and illustrating the connection of the towing hitch extension with a ball hitch.
Figure 2:
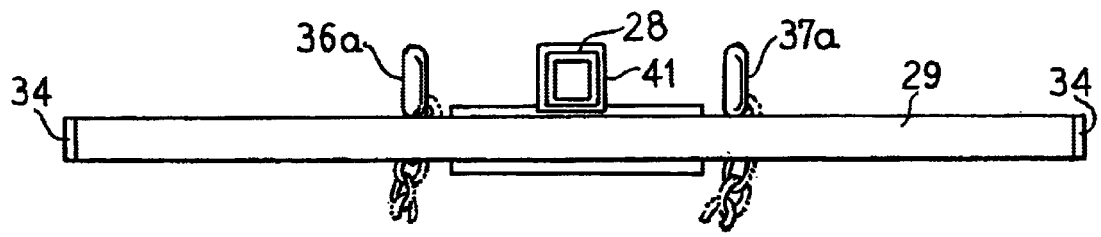
FIG. 2 is a trailing side elevational view of the hitch extension of FIG. 1.
Figure 3:
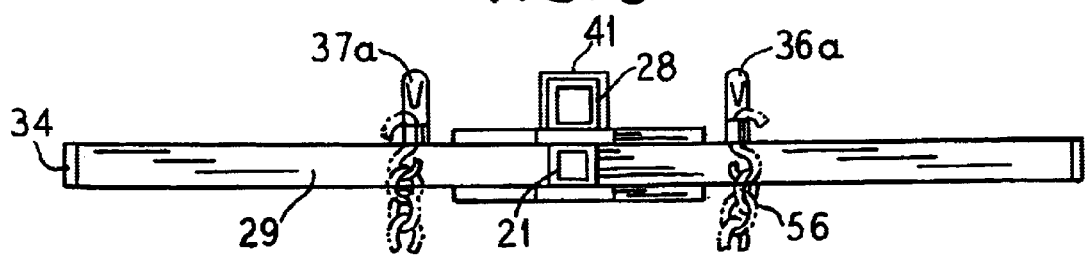
FIG. 3 is a leading side elevational view of the hitch extension of FIG. 1.
Figure 5:
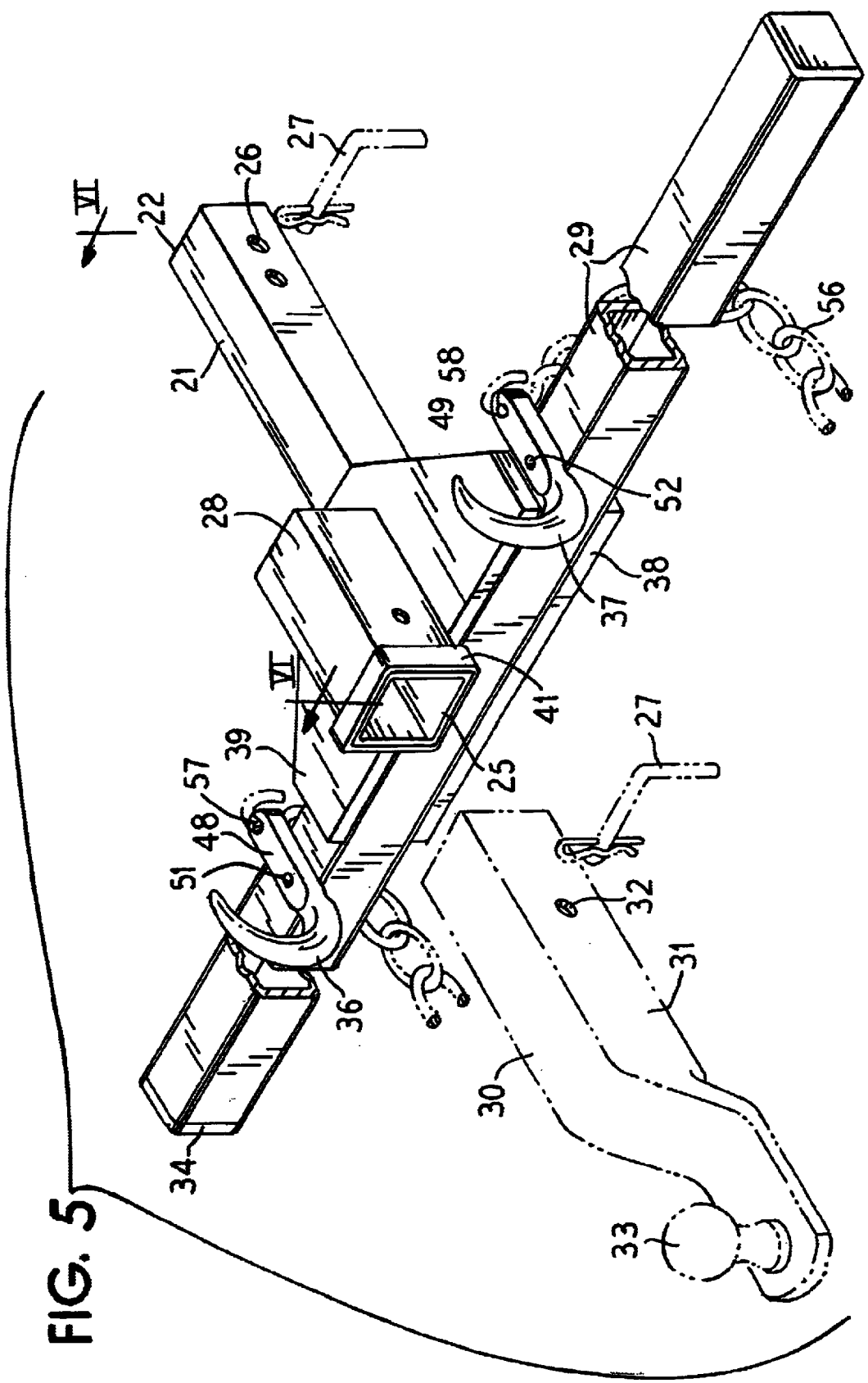
FIG. 5 is an enlarged, detail view of the hitch extension of FIG. 1, some parts thereof broken away and some parts thereof shown in section and illustrating the connection of the hitch extension with a ball hitch.

Referring to the drawings, FIGS. 1–6 show a presently preferred embodiment of a towing hitch extension 15 that is adapted to protect the rear bumper 16 of a towing vehicle 17 having a rear towing hitch 18 to which the towing hitch extension 15 is attached, as now explained.

The towing hitch extension 15 incorporates a somewhat elongated, preferably longitudinally straight, tow bar 21 having a front end 22 and a rear end 23. The tow bar 21 extends generally longitudinally relative to the towing vehicle 17 and the rear towing hitch 18. The front end 22 is adapted for releasable coupling engagement with a socket 24 of the towing hitch 18. Thus, the tow bar 21 is, as shown, preferably comprised of tubular steel stock that is cross-sectionally rectangular (preferably substantially square) as is the socket 24 defined at the rear of the towing hitch 18. The front end 22 of the tow bar 21 is telescopically engageable with and matingly receivable in the open rear end of the socket 24. The front end 22 and the socket 24 are each provided with alignable holes 26 through which a conventional removable coupling cross pin 27 is transversely extendable, thereby making the tow bar 21 drawable relative to the towing hitch 18.

The mid-region of a transversely extending, horizontally oriented, elongated cross bar 29 is fastened medially across and against the rear end 23. The cross bar 29 extends generally and preferably straight longitudinally, but is oriented transversely relative to the towing vehicle 17. Various means for fastening the cross bar 29 to the tow bar 21 can be employed, as those skilled in the art will readily appreciate, but preferably welding is employed. A preferred arrangement is described below. Preferably, and as shown, the cross bar 29 is comprised of a cross-sectionally rectangular (preferably substantially square) tubular steel stock. Conveniently and preferably, the opposite ends of the cross bar 29 are fitted with closing caps 34 which can be comprised of a molded plastic, welded steel plating or sheeting, or the like. Preferably, the cross-sectional size of the cross bar 29 and the receiver socket 28 each approximately corresponds to the cross-sectional size of the tow bar 21.

Figure 7:
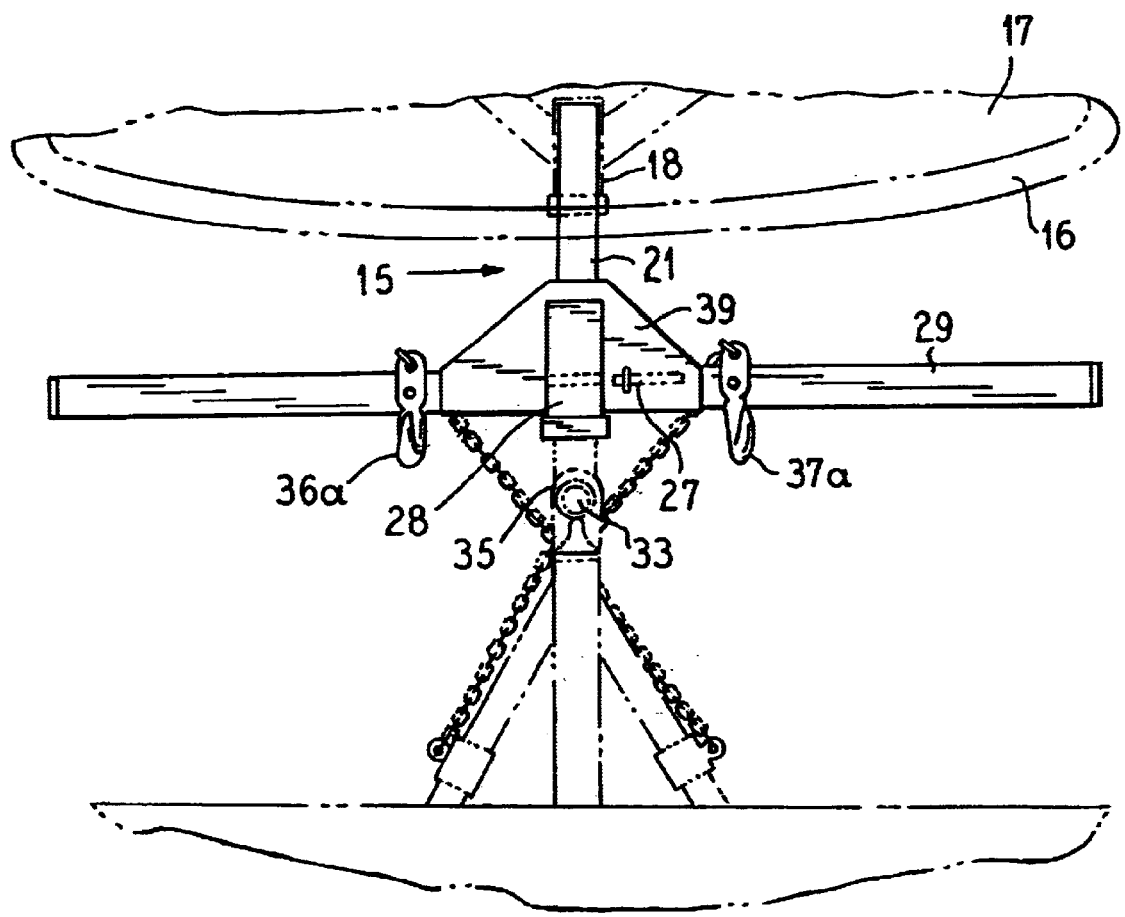
FIG. 7 is a partially diagrammatic, illustrative plan view of a towing vehicle that is connected to a towed vehicle through the inventive towing hitch extension.

A trailer hitch receiver, which is preferably a socket 28 (as shown), is mounted preferably adjacent to, and vertically over, the rear end 23 of the tow bar 21. Various alternative configurations and mounting means can be used, if desired. Here, the hitch receiver socket 28 preferably (as shown) comprises a relatively short, straight length of cross-sectionally rectangular (preferably substantially square) steel tubing that is mounted adjacent and parallel to the tow bar 21, a presently preferred mounting arrangement being further explained below. The mounting means for the receiver socket 28 can be mechanical (such as bolts, rivets, or the like) or can be welding (preferred). The hitch receiving socket 28 is oriented so that its socket mouth 25 rearwardly opens and is adapted to telescopically engage and matingly receive the base or connection portion of a conventional hitch ball mount assembly 31. The ball 33 of assembly 31 is adapted to be engaged with a conventional hitch tongue 35 of a towed trailer or the like (not detailed, but see FIG. 7, for example). The hitch receiver socket 28 and the connection portion 30 of the hitch ball assembly 31 are each provided with alignable holes 32 through which a conventional removable coupling cross pin 27 or the like is transversely extendable, thereby to make the ball mount 31 drawable relative to the socket 28. If desired, for purposes of aligning the towing hitch extension 15 and the receiver socket 28 with the hitch ball mount assembly 31 that is associated with a particular towed vehicle, the orientation of the towing hitch extension 15 can be reversed from the preferred upright configuration shown in the drawings by inverting the association of the tow bar 21 with the towing hitch 18.

Preferably, and as shown, the towing hitch extension 15 includes brace means to rigidify the cross bar 29 relative to the tow bar 21. Various types and forms of bracing may be employed. Preferably, in the towing hitch extension 15, the brace means comprises a pair of metal, preferably steel, plate members 38 and 39 that are positioned one above the other on opposing sides of the cross bar 29 and the tow bar 21 in the region where the bars 29 and 21 abuttingly interconnect. For purposes of convenient overfitting of the tow bar 21 and the cross bar 29, the pair of plate members 38 and 39 each preferably have a hexagonal perimeter configuration that is adapted to rest adjacent portions of the cross bar 29 and the tow bar 21. Thus, in the preferred embodiment 15 shown, one side of each plate 38, 39 extends parallel to the back side of the cross bar 29 while the opposite side of each plate 38, 39 extends across and over the tow bar 21 in spaced, adjacent relationship to the rear end 23 with the local plate width at this opposite side being about equal to the width of the tow bar 21, and with the local width of the side of each plate 38, 39 over the cross bar 29 being about equal to the width of the cross bar 29. Preferably, vertically adjacent surface portions of the plates 38, 39 relative to the cross bar 29 and the tow bar 21 are welded together. Various plate configurations can be employed.

Preferably, the under surface of the trailer hitch receiver socket 28 rests against outside surface portions of the top plate 39, and preferably the trailer hitch receiver socket 28 is welded to the plate 39. Optionally but preferably, the edge portions of the open end of each trailer hitch receiver socket 28 and 24 are provided with a protective edge facing 41 (preferably a metal sleeve).

The towing hitch extension 15 is preferably provided with a pair of guard projections 36 and 37 that each upstand from the cross bar 29. Each projection 36, 37 is connected to the cross bar 29 in laterally spaced but adjacent relationship relative to a different respective opposite longitudinal side of the tow bar 21. Various means for connection of the cross bar 29 to a base portion of each projection 36, 37 can be employed, such as screws or welding (preferred). For example, when the projections comprise tow hooks 36a, 37a, a screw (not shown) can be extended through a hole 51, 52 in each hook 36a, 37a and threadably engaged with a mating threaded hole provided in the upper side of the cross bar 29. A lock washer (not shown) can be placed on the shank of each screw, if desired. However, welding is preferred.

Presently, it is preferred to employ as each upstanding guard projection 36, 37 a conventional tow hook 36a, 37a. Each hook 36a, 37a is preferably transversely oriented relative to the cross bar 29 so that the hook portion 46, 47 thereof is forwardly opening and so that the base portion 48, 49 thereof is flattened and extends transversely across, against and over an upper surface portion of the cross bar 29. Thus, each hook portion 46, 47 is spatially oriented so that it initially curves upwards rearwardly and then has its hook end terminate above and in spaced adjacent relationship to adjacent portions of the draw bar 29. When the base portion 48, 49 of each hook 36a, 37a is flattened, it rests upon an adjacent upper side surface portion of the cross bar 29.

However, various structures can be employed as the guard projections 36, 37, including but not limited to metal rod sections, and the like.

When two tow hooks are used as guard protectors, preferably each tow hook 36a, 37a has a base or bottom portion 48, 49 with a region that extends forwardly beyond the cross bar 29 and has an aperture 57, 58 therethrough that is adapted to receive and engage with a terminal end portion (which can be configured as an S-hook or the like) of a safety chain 56 that is associated with a towed trailer or the like. Typically, a mid region of the safety chain 56 is engaged with a portion of a towed vehicle having a connecting hitch with a tongue 35. The tongue 35 is engaged with a ball mount 31 that is connected to the hitch socket 28.

Numerous structural and functional modifications and adaptations may be achieved, as those of ordinary skill in the art will readily appreciate, without departing from the spirit and scope of the invention.

What is claimed is:

1. A towing hitch extension adapted to protect the rear bumper of a towing vehicle for detachably attaching to a rear towing hitch of a towing vehicle, said towing hitch extension comprising in combination:

a tow bar having front and rear ends;

a front coupling means at said front end for releasable coupling engagement with said towing hitch;

a transversely extending, horizontally oriented, elongated cross bar extending across and medially adjoining said rear end;

a rearwardly opening towing hitch socket mounted at said rear end and vertically offset relative to said tow bar and said cross bar; and said towing hitch socket being telescopically and matingly engageable with a ball mount assembly and being retainable in association therewith by coupling pin means inserted transversely through such so engaged members.

2. The towing hitch extension of claim 1 wherein:

said rear towing hitch has a rearwardly opening, cross-sectionally rectangular socket;

each of said tow bar, said cross bar, and said towing hitch socket is tubular and has a cross-sectionally rectangular configuration;

said front end is telescopically and matingly engageable with said towing hitch socket and is retained in association therewith by coupling pin means inserted transversely through such so engaged members; and said towing hitch socket is telescopically and matingly engageable with a base portion of a ball mount assembly and is retained in association therewith by coupling pin means inserted transversely through such so engaged members.

3. The towing hitch extension of claim 1 including brace means fixed to said tow bar and to said cross bar for restraining and reinforcing the position of said cross bar relative to said tow bar.

4. The towing hitch extension of claim 3 wherein said brace means comprises a pair of metal plate members positioned one above the other with adjoining portions of said tow bar and said cross bar disposed therebetween.

5. The towing hitch extension of claim 4 wherein portions of each of said plate members is welded to generally vertically adjacent portions of each of said tow bar and said cross bar.

6. The towing hitch extension of claim 5 wherein the upper one of said metal plate members is welded to generally vertically generally portions of said trailer hitch socket.

7. The tow hitch extension of claim 6 wherein each of said plate members has a generally hexagonal perimeter configuration.

8. The towing hitch extension of claim 1 including a pair of guard projections that each upstand from said cross bar in laterally spaced but adjacent relationship relative to a different respective opposite side of said tow bar.

9. The towing hitch extension of claim 8 wherein each of said guard projections is connected against an upper surface portion of said cross bar by weldments.

10. The towing hitch extension of claim 8 wherein each of said guard projections comprises a tow hook which is oriented so that the hook portion thereof is forwardly opening and the base portion thereof extends transversely across and against an upper surface portion of said cross bar.

11. The towing hitch extension of claim 10 wherein said base portion of each of said tow hooks includes a region that extends forwardly beyond said cross bar, and each said region includes an aperture therethrough that is adapted to receive and engage a terminal end portion of a safety chain whose mid region is adapted to engage with a portion of a towed vehicle having a hitch with a tongue that is engaged with a ball mount that is connected to said trailer hitch socket.

12. A towing hitch extension adapted to protect the rear bumper of a towing vehicle for detachably attaching to a rear towing hitch of a towing vehicle, said towing hitch extension comprising in combination a tow bar having front and rear ends;

a front coupling means at said front end for releasable coupling engagement with said towing hitch;

a transversely extending, horizontally oriented, elongated cross bar extending across and medially joining said rear end;

a rearwardly opening towing hitch socket mounted at said rear end vertically over said tow bar and said cross bar;

brace means fixed to said tow bar and to said cross bar for restraining and reinforcing the position of said cross bar relative to said tow bar;

each of said tow bar, said cross bar, and said towing hitch socket being tubular and having a cross-sectionally rectangular configuration, and said towing hitch socket being telescopically and matingly engageable with a ball mount assembly and being retainable in association therewith by coupling pin means inserted transversely through such so engaged members.

13. The towing hitch extension of claim 12 wherein said brace means comprises a pair of metal plate members positioned one above the other with adjoining portions of said tow bar and said cross bar disposed therebetween.

14. The towing hitch extension of claim 13 wherein portions of each of said plate members is welded to generally vertically adjacent portions of each of said tow bar and said cross bar.

15. The towing hitch extension of claim 14 wherein the upper one of said metal plate members is welded to generally vertical portions of said trailer hitch socket.

16. The tow hitch extension of claim 15 wherein each of said plate members has a generally hexagonal perimeter configuration.

17. A towing hitch extension adapted to protect the rear bumper of a towing vehicle for detachably attaching to a rear towing hitch of a towing vehicle, said rear towing hitch has a rearwardly opening, cross-sectionally rectangular socket, said towing hitch extension comprising in combination a tow bar having front and rear ends;

a front coupling means at said front end for releasable coupling engagement with said towing hitch;

a transversely extending, horizontally oriented, elongated cross bar extending across and medially adjoining said rear end;

a rearwardly opening towing hitch socket mounted at said rear end vertically over said tow bar and said cross bar;

each of said tow bar, said cross bar, and said towing hitch socket being tubular and having a cross-sectionally rectangular configuration;

said front end being telescopically and matingly engageable with said towing hitch socket and being retainable in association therewith by coupling pin means inserted transversely through such so engaged members;

said towing hitch socket is telescopically and matingly engageable with a base portion of a ball mount assembly and being retainable in association therewith by coupling pin means inserted transversely through such so engaged members;

brace means fixed to said tow bar and to said cross bar for restraining and reinforcing the position of said cross bar relative to said tow bar, said brace means comprising a pair of metal plate members positioned one above the other with adjoining portions of said tow bar and said cross bar being disposed therebetween, portions of each of said plate members are welded to generally vertically adjacent portions of each of said tow bar and said cross bar and portions of the upper one of said metal plate members are welded to generally vertically adjacent portions of said trailer hitch socket; and a pair of guard projections that each upstand from said cross bar in laterally spaced but adjacent relationship relative to a different respective opposite side of said tow bar, each of said guard projections being connected against an upper surface portion of said cross bar by weldments.

18. The tow hitch extension of claim 17 wherein each of said plate members has a generally hexagonal perimeter configuration.

19. The towing hitch extension of claim 8 wherein each of said guard projections comprises a tow hook which is oriented so that the hook portion thereof is forwardly opening and so that the base portion thereof extends transversely across and against an upper surface portion of said cross bar.

20. The towing hitch extension of claim 19 wherein said base portion of each of said tow hooks includes a region that extends forwardly beyond said cross bar, and each said region includes an aperture therethrough that is adapted to receive and engage a terminal end portion of a safety chain whose mid region is adapted to engage with a portion of a towed vehicle having a hitch with a tongue is engaged with a ball mount that is connected to said trailer hitch socket.

* * * * *